United States Patent
Turina et al.

(10) Patent No.: US 11,929,882 B2
(45) Date of Patent: Mar. 12, 2024

(54) MIGRATION TO INDIRECT COMMUNICATION MODE IN A SERVICE-BASED ARCHITECTURE

(71) Applicant: Telefonaktiebolaget LM Ericsson (publ), Stockholm (SE)

(72) Inventors: Klaus Turina, Herzogenrath (DE); Volker Kleinfeld, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/780,078

(22) PCT Filed: Nov. 28, 2019

(86) PCT No.: PCT/EP2019/082973
§ 371 (c)(1),
(2) Date: May 26, 2022

(87) PCT Pub. No.: WO2021/104636
PCT Pub. Date: Jun. 3, 2021

(65) Prior Publication Data
US 2023/0006888 A1 Jan. 5, 2023

(51) Int. Cl.
*H04L 41/122* (2022.01)
*H04L 41/082* (2022.01)
*H04L 41/0895* (2022.01)

(52) U.S. Cl.
CPC .......... *H04L 41/122* (2022.05); *H04L 41/082* (2013.01); *H04L 41/0895* (2022.05)

(58) Field of Classification Search
CPC ..... H04L 41/0806; H04L 41/12; H04L 45/02; H04L 45/037; H04L 45/64; H04L 61/10;
(Continued)

(56) References Cited

U.S. PATENT DOCUMENTS 6,804,716 B1 * 10/2004 Koch .................... H04M 15/58
709/224
10,833,938 B1 * 11/2020 Rajput ................ H04L 67/1095
(Continued)

OTHER PUBLICATIONS

"3rd Generation Partnership Project; Technical Specification Group Core Network and Terminals; 5G System; Network Function Repository Services; Stage 3 (Release 16)", 3GPP TS 29.510 V16.1.1, Oct. 2019, 150 pages.
(Continued)

*Primary Examiner* — Greg C Bengzon
(74) *Attorney, Agent, or Firm* — Murphy, Bilak & Homiller, PLLC

(57) ABSTRACT

There is provided a method of operating a Service Communication Proxy, SCP, node (608, 1000) in a communication network as a proxy network repository function, NRF, for a first network function, NF, producer node in the communication network. The first NF producer node (602, 1100) is to migrate from a direct communication mode with a first NF consumer node (606) to an indirect communication mode with the first NF consumer node (606) via the SCP node (608, 1000). The SCP node (608, 1000) discovers a NF profile for the first NF producer node (602, 1100), wherein the NF profile for the first NF producer node (602, 1100) is stored by a first network repository function, NRF, node (604) in the communication network, and the NF profile comprises a service address for the first NF producer node (602, 1100); receives a registration request from the first NF producer node (602, 1100), wherein the registration request is a request to register a NF profile for the first NF producer node (602, 1100) at a NRF node (604), wherein the registration request indicates the service address for the first NF producer node (602, 1100); and, in response to the received registration request, sends an update request to the first NRF node (604) to update the NF profile for the first NF producer
(Continued)

node (602, 1100) stored by the first NRF node (604) to replace the service address of the first NF producer node (602, 1100) with a first service address of the SCP node (608, 1000) that is associated with the service address of the first NF producer node (602, 1100).

16 Claims, 9 Drawing Sheets

(58) Field of Classification Search
CPC . H04L 61/4511; H04L 61/4541; H04L 67/10; H04L 67/56; H04L 67/562; H04L 67/563; H04L 67/567; H04L 67/148
See application file for complete search history.

(56) References Cited

U.S. PATENT DOCUMENTS

| | | | | |
|---|---|---|---|---|
| 11,271,846 | B2* | 3/2022 | Krishan | H04L 45/02 |
| 2021/0067480 | A1* | 3/2021 | Goel | H04L 61/10 |
| 2021/0067485 | A1* | 3/2021 | Goel | H04L 61/4511 |
| 2021/0111985 | A1* | 4/2021 | Mahalank | H04L 45/02 |
| 2021/0152554 | A1* | 5/2021 | Taft | H04L 41/0895 |
| 2022/0272165 | A1* | 8/2022 | Bawa | H04L 67/51 |
| 2022/0295386 | A1* | 9/2022 | Lu | H04W 48/16 |

OTHER PUBLICATIONS

3GPP, "3GPP TR 33.855 V1.8.0", 3rd Generation Partnership Project; Technical Specification Group Services and System Aspects; Security Aspects; Study on security aspects of the 5G Service Based Architecture (SBA) (Release 16), Oct. 2019, 1-102.

3GPP, "3GPP TS 23.501 V16.2.0", 3rd Generation Partnership Project; Technical Specification Group Services and System Aspects; System Architecture for the 5G System; Stage 2 (Release 16), Sep. 2019, 1-394.

3GPP, "3rd Generation Partnership Project; Technical Specification Group Services and System Aspects; System Architecture for the 5G System; Stage 2 (Release 16)", 3GPP TS 23.501 V16.1.0, Jun. 2019, pp. 1-368.

Nokia, et al., "Discussion paper on policy-based authorization for indirect communication", 3GPP TSG SA WG3 (Security) Meeting #95Bis, S3-192250, revision of S3-19xabc, Sapporo, Japan, Jun. 24-28, 2019, 1-4.

Nokia, et al., "New Key Issue: Security aspects of Service Communication Proxy (SCP)", 3GPP TSG SA WG3 (Security) Meeting #94Ad-Hoc, S3-190869, Stockholm (Sweden), Mar. 11-15, 2019, 1-2.

Ryde, Anders, et al., "5G SBA signaling study—Report", Ericsson Internal Technical Report, Apr. 24, 2019, 1-60.

* cited by examiner

MIGRATION TO INDIRECT COMMUNICATION MODE IN A SERVICE-BASED ARCHITECTURE

TECHNICAL FIELD

Embodiments described herein relate to a service-based architecture in a core network of a communication network, and in particular to methods and apparatus for migrating from a direct communication mode to an indirect communication mode.

BACKGROUND

The $3^{rd}$ Generation Partnership Project (3GPP) is currently standardising and enhancing the 5G Core (5GC) network as part of the overall 5G System architecture. Prior to 3GPP Release 15 (Rel-15), the functional distribution within the core network (CN) was based on Network Elements exchanging messages over point to point interfaces. With 3GPP Rel-15 5GC, to facilitate cloud native implementations and deployments, a Service-Based Architecture (SBA) has been introduced, based on the concept of Network Functions (NF) offering and consuming NF Services over Service Based Interfaces (SBIs). A dynamic service-based Network Function (NF) interaction with other network functions can be characterised by:

- The NF registers in a Network Repository Function (NRF) the list of services provided or offered by the NF.
- Other NFs can discover the NF services using the NRF and select a specific instance of the NF.
- The NFs consume NF services of the selected NF instance.

FIG. 1 illustrates the 5G system reference architecture 101 showing service-based interfaces used within the Control Plane (CP). It will be appreciated that not all NFs are depicted. Service-based interfaces are represented in the format Nxyz and point to point interfaces in the format Nx. The reference architecture 101 comprises a Network Slice Selection Function (NSSF) 102 that has a Nnssf interface, a Network Exposure Function (NEF) 103 that has a Nnef interface, a NRF 104 that has a Nnrf interface, a Policy Control Function (PCF) 105 that has a Npcf interface, a Unified Data Management (UDM) 106 that has a Nudm interface, an Application Function (AF) 107 that has a Naf interface, an Authentication Server Function (AUF) 108 that has a Nausf interface, an Access and Mobility Management Function (AMF) 109 that has a Namf interface, a Session Management Function (SMF) 110 that has a Nsmf interface and a Network Data Analytics Function (NWDAF) 116 that has a Nnwdaf interface.

The NRF 104 is a key NF within the 5GC SBA Framework that provides registration and discovery capabilities among the different NFs within the 5GC. In short, when a given NF (e.g. UDM type) registers a NF profile in the NRF 104, other NFs may discover it automatically by simply querying the NRF 104 to find NFs of a given type (e.g. UDM type).

The AMF 109 has an N1 interface to a user equipment (UE) 112, and an N2 interface to an access network (AN) 113 (which can be a radio AN, RAN). The SMF 110 has an N4 interface to a User Plane Function (UPF) 114. The interface between the R(AN) 113 and the UPF 114 is the N3 interface, and the interface between the UPF 114 and a Data Network 115 is the N6 interface.

The 5G Service Based Architecture (SBA) in 3GPP Rel-15 supports a communication model where Service Consumer and Service Producers are, on an application communication layer, directly connected to each other. This is referred to as direct communication. In this direct communication model, two modes exist. Mode A where Consumers statically know about the Producer instances and Mode B where the Consumers dynamically make use of a NRF to determine the available Producer Instances and their individual attributes contained in their NF profiles (nfProfiles). The latter is the more flexible and less OPEX intense mode and is therefore expected to be primarily used in 3GPP Rel-15 SBA network deployments. The different direct communication modes A and B are depicted in the top part of FIG. 2.

As part of the work in 3GPP Release 16 (Rel-16) to enhance Service Based Architecture (eSBA) the service based communication model is enhanced with modes where a Service Consumer and a Service Producer communicate via an intermediary function. This intermediary is called a Service Communication Proxy (SCP). This communication mode is named 'indirect communication mode'. The SCP is intended to offload consumers by some non-consumer business logic tasks that are common to multiple consumers, such as final producer instance selection, load balancing, re-routing, etc. There are two modes of indirect communication defined in 3GPP Rel-16, which are denoted mode C and mode D. These modes are shown in the bottom part of FIG. 2.

In Mode C the Consumer remains, like in direct communication mode B, in charge of discovering the producer instances via NRF. Thus this mode has the advantage of being compatible for Service Consumers that are compliant to mode B, but it leaves the Consumers with the burden to filter and select among all the potential Producers that could be suitable for serving a request. Primarily due to its compatibility with mode B, it is expected that mode C will be quickly adopted in 5G Core networks. The mode D of indirect communication goes one step further and relieves the Service Consumers of the need to interrogate the NRF and perform Service Producer instance discovery and selection. As these discovery, filtering and selection tasks are not in the core function of the Consumers they are delegated to the SCP—with an expectation to unify and simplify them across the network. That is why mode D is also referred to as 'indirect communication with delegated discovery', in contrast to mode C which is called the 'indirect communication without delegated discovery'. Mode D however requires modifications to Consumer behaviour and enhanced procedures between the Consumer and SCP. Therefore, this is likely to be adopted in later phases of 5G Core deployments.

When evolving a 5G Core Network from direct communication mode B to an indirect communication mode the SCP acts on behalf of the Producer towards Consumers and the NRF (e.g. see 3GPP 23.501 v 16.1, Annex G.3). To place itself as proxy in the communication path the SCP performs address modification on the nfProfile so that Consumers will contact the SCP proxy addresses instead of communicating directly with Service Producers. In order to do this the SCP will need to act as a NRF to the Producer and thus the Producer must change the NRF address from the 'real' NRF to the SCP as a NRF proxy.

FIG. 3 visualises the migration from direct communication mode B (in the top part of FIG. 3 where the Consumer and Producer both communicate with the NRF) to an indirect communication mode in 3GPP service-based communication (the bottom part of FIG. 3 where the communications between the Consumer and the Producer are via the SCP and where the SCP acts as a proxy for the Consumer and the Producer to the NRF.

SUMMARY

An analysis of the behaviour of NF Producers shows that when changing the NRF address the Producer will de-register its nfProfile in the old NRF, and shortly after it will register the nfProfile again in the new NRF. That means for service consumers all services offered by the producers will become unavailable before they are registered again via the SCP. If Consumers have subscribed to nfStatus updates in the NRF they will at deregistration immediately be notified of the de-registration event of the Producer services. This will lead to service impacts due to Consumers being forced to perform a Producer re-selection or even release contexts.

The techniques described herein propose a modified procedure for the migration to an indirect communication mode. In some embodiments, on the Producer side the behaviour can be changed in a way that when changing the NRF address it is possible to either skip sending the de-registration request to the old NRF, or, if this is not possible, to send the de-registration request to the old NRF via the SCP as proxy. In any case the Producer sends a registration to the new NRF via the SCP as a proxy.

An important part of the disclosed techniques is on the SCP side in handling the Producer registration. In some embodiments, as a first step the SCP can be enhanced in a way that it discovers all nfProfiles of the Producer (this can either be for multiple nfTypes or one nfType only). This must be done before the registration of the Producer via the SCP can be handled. So, when the Producer is reconfigured, and the SCP receives a nfRegister request, the SCP can determine whether this Producer nfInstance is already known in the NRF. If so, the SCP modifies the nfRegister to a nfUpdate when sending it to the NRF. Thus, the NRF will get updated information about the service addresses in an existing nfProfile for the Producer instead of registering a new nfProfile for the Producer. The updated service addresses can be communicated to all Consumers as in Rel-15.

In addition, in certain embodiments, the SCP can be prepared for a Producer be unable to skip sending a de-registration request to the old NRF when the NRF address is changed (see the paragraph above). To prevent the temporary de-registration impacting the service, the SCP answers the de-registration request with a 'success' without propagating the de-registration request to the NRF. In certain embodiments, the SCP can differentiate this case from 'normal' de-registration which should be propagated to the NRF. This can be done in multiple ways for example by an 'NRF-change indicator' in the de-registration request message, by a configuration in the SCP, or by having a time-window monitored by the SCP so it delays the de-registration request to see if the same instance is re-registered immediately, etc.

According to a first aspect, there is provided a method of operating a Service Communication Proxy, SCP, node in a communication network as a proxy network repository function, NRF, for a first network function, NF, producer node in the communication network, wherein the first NF producer node is to migrate from a direct communication mode with a first NF consumer node to an indirect communication mode with the first NF consumer node via the SCP node 608. The method in the SCP node comprises: discovering a NF profile for the first NF producer node, wherein the NF profile for the first NF producer node is stored by a first network repository function, NRF, node in the communication network, and the NF profile comprises a service address for the first NF producer node; receiving a registration request from the first NF producer node, wherein the registration request is a request to register a NF profile for the first NF producer node at a NRF node, wherein the registration request indicates the service address for the first NF producer node; and, in response to the received registration request, sending an update request to the first NRF node to update the NF profile for the first NF producer node stored by the first NRF node to replace the service address of the first NF producer node with a first service address of the SCP node that is associated with the service address of the first NF producer node.

According to a second aspect, there is provided a method of operating a first network function, NF, producer node in a communication network, wherein the first NF producer node is to migrate from a direct communication mode with a first NF consumer node to an indirect communication mode with the first NF consumer node via a Service Communication Proxy, SCP, node in the communication network. The method in the first NF producer node comprises: updating a stored service address for a network repository function, NRF, node in the communication network to a service address of the SCP node, wherein the NRF node is storing a NF profile for the first NF producer node; and sending a registration request the SCP node, wherein the registration request is a request to register a NF profile for the first NF producer node at the SCP node.

According to a third aspect, there is provided a computer program product comprising a computer readable medium having computer readable code embodied therein, the computer readable code being configured such that, on execution by a suitable computer or one or more processing units, the computer or one or more processing units is caused to perform the method according to the first or second aspects.

According to a fourth aspect, there is provided a Service Communication Proxy, SCP, node for use in a communication network as a proxy network repository function, NRF, for a first network function, NF, producer node in the communication network. The first NF producer node is to migrate from a direct communication mode with a first NF consumer node to an indirect communication mode with the first NF consumer node via the SCP node 608. The SCP node is configured to: discover a NF profile for the first NF producer node, wherein the NF profile for the first NF producer node is stored by a first network repository function, NRF, node in the communication network, and the NF profile comprises a service address for the first NF producer node; receive a registration request from the first NF producer node, wherein the registration request is a request to register a NF profile for the first NF producer node at a NRF node, wherein the registration request indicates the service address for the first NF producer node; and, in response to the received registration request, send an update request to the first NRF node to update the NF profile for the first NF producer node stored by the first NRF node to replace the service address of the first NF producer node with a first service address of the SCP node that is associated with the service address of the first NF producer node.

According to a fifth aspect, there is provided a first network function, NF, producer node for use in a communication network. The first NF producer node is to migrate from a direct communication mode with a first NF consumer node to an indirect communication mode with the first NF consumer node via a Service Communication Proxy, SCP, node in the communication network. The first NF producer node is configured to: update a stored service address for a network repository function, NRF, node in the communication network to a service address of the SCP node, wherein the NRF node is storing a NF profile for the first NF producer node; and send a registration request the SCP node, wherein the registration request is a request to register a NF profile for the first NF producer node at the SCP node.

According to a sixth aspect, there is provided a Service Communication Proxy, SCP, node for use in a communication network as a proxy network repository function, NRF, for a first network function, NF, producer node in the communication network. The first NF producer node is to migrate from a direct communication mode with a first NF consumer node to an indirect communication mode with the first NF consumer node via the SCP node 608. The SCP node comprises processing circuitry and a memory, said memory containing instructions executable by said processing circuitry, whereby said SCP node is operative to: discover a NF profile for the first NF producer node, wherein the NF profile for the first NF producer node is stored by a first network repository function, NRF, node in the communication network, and the NF profile comprises a service address for the first NF producer node; receive a registration request from the first NF producer node, wherein the registration request is a request to register a NF profile for the first NF producer node at a NRF node, wherein the registration request indicates the service address for the first NF producer node; and, in response to the received registration request, send an update request to the first NRF node to update the NF profile for the first NF producer node stored by the first NRF node to replace the service address of the first NF producer node with a first service address of the SCP node that is associated with the service address of the first NF producer node.

According to a seventh aspect, there is provided a first network function, NF, producer node for use in a communication network. The first NF producer node is to migrate from a direct communication mode with a first NF consumer node to an indirect communication mode with the first NF consumer node via a Service Communication Proxy, SCP, node in the communication network. The first NF producer node comprises processing circuitry and a memory, said memory containing instructions executable by said processing circuitry whereby said first NF producer node is operative to: update a stored service address for a network repository function, NRF, node in the communication network to a service address of the SCP node, wherein the NRF node is storing a NF profile for the first NF producer node; and send a registration request the SCP node, wherein the registration request is a request to register a NF profile for the first NF producer node at the SCP node.

Embodiments of the disclosed techniques provide that service Consumers will not experience service impacts due to a change from a direct communication mode to an indirect communication mode. Essentially, this is because the sequence of events in the NRF changes from the current 're-register nfProfile with old service addresses' and 're-register nfProfile with new service addresses' to the new 'update existing nfProfile with new service addresses'. Using these techniques means that the temporary 'disappearance' of the Producer service in the NRF, with its negative impacts on Consumers, is avoided.

As a consequence, the migration from a direct communication mode to an indirect communication mode in a Service-Based Architecture can be managed without impacting ongoing end user services.

BRIEF DESCRIPTION OF THE DRAWINGS

For a better understanding of the embodiments of the present disclosure, and to show how it may be put into effect, reference will now be made, by way of example only, to the accompanying drawings, in which.

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Figure 1:
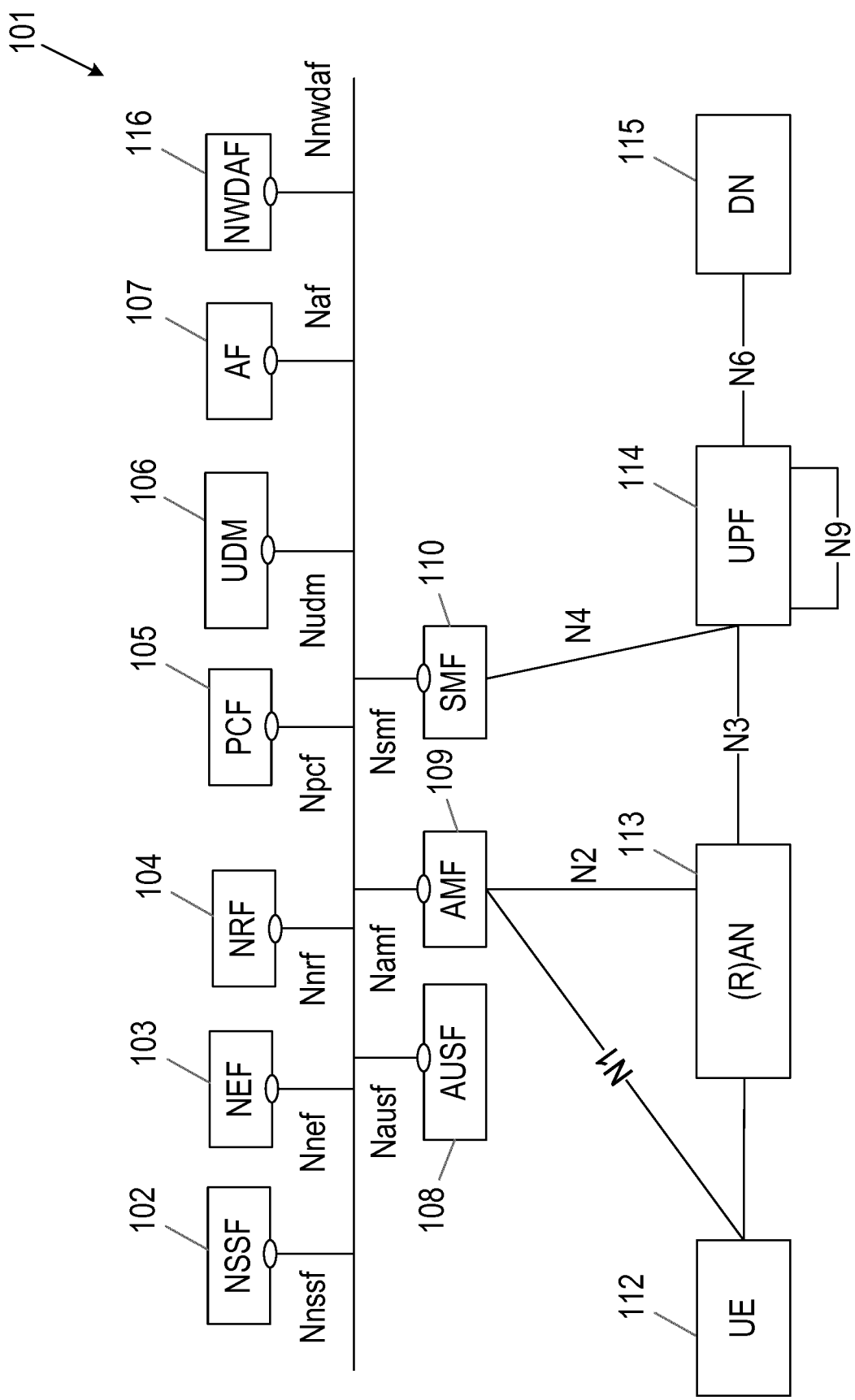
FIG. 1 illustrates the 5G System reference architecture showing service-based interfaces used within the Control Plane.
Figure 2:
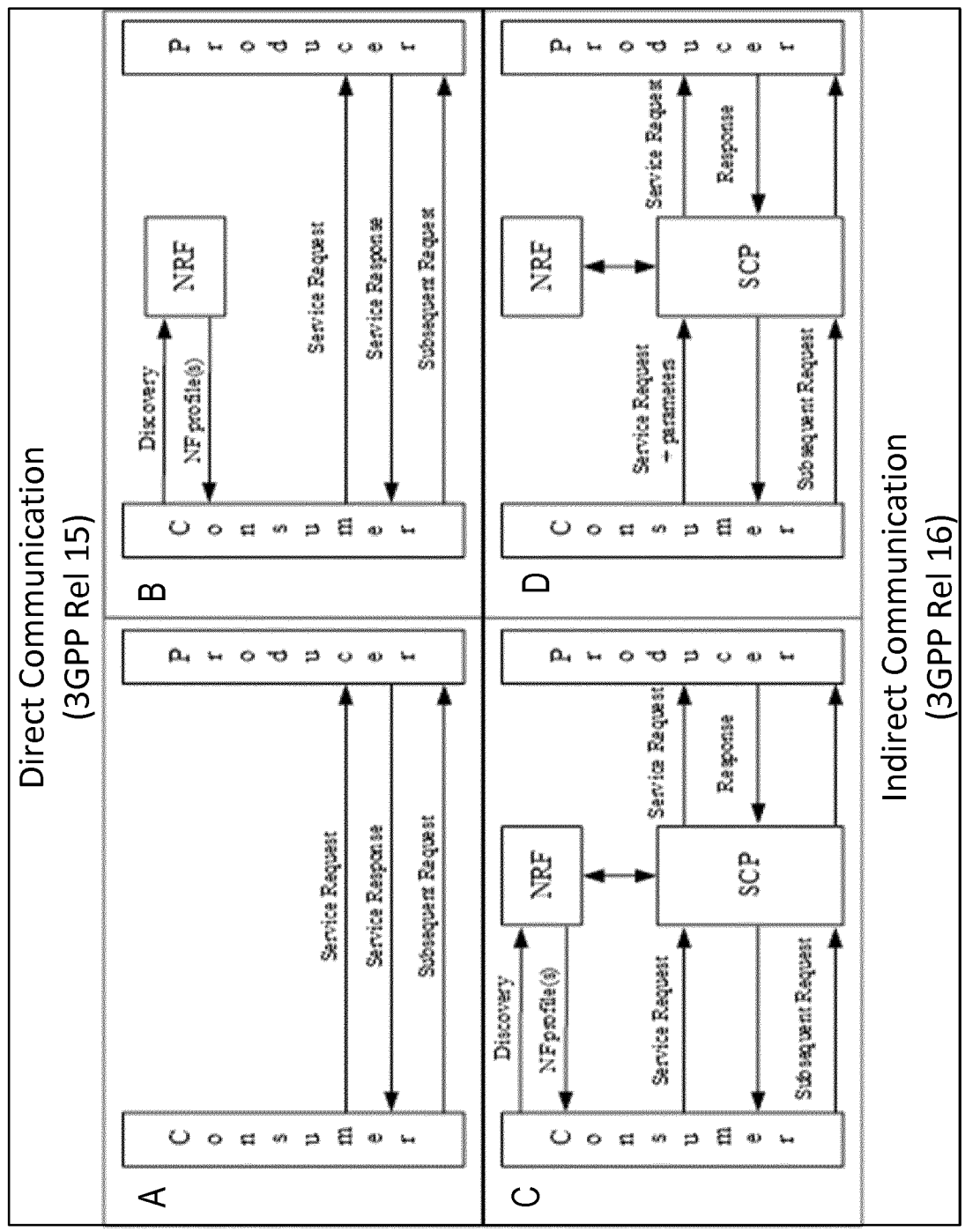
FIG. 2 illustrates options for direct communication modes and indirect communication modes.
Figure 3:
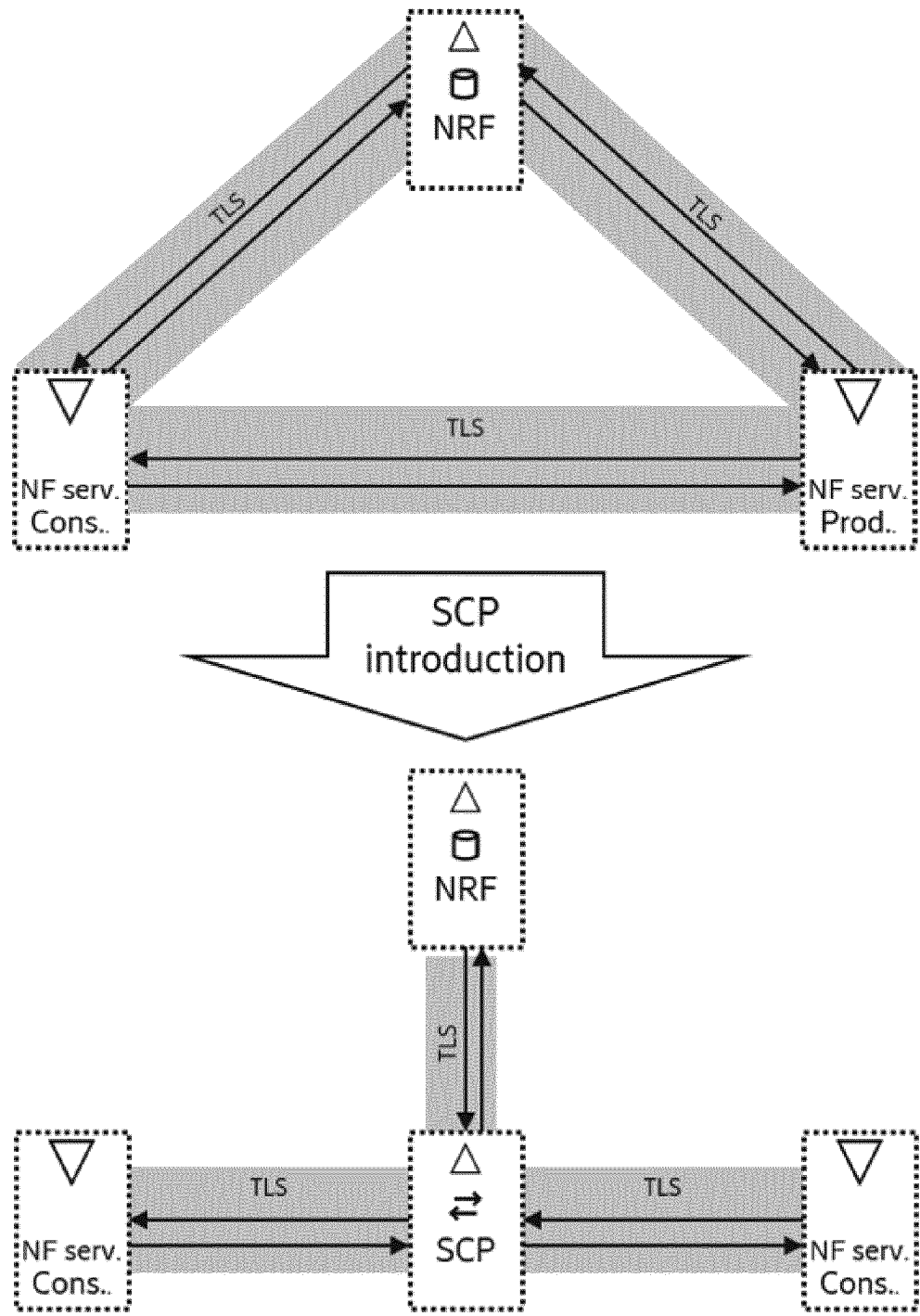
FIG. 3 illustrates migration from direct communication mode B to an indirect communication mode.
Figure 4:
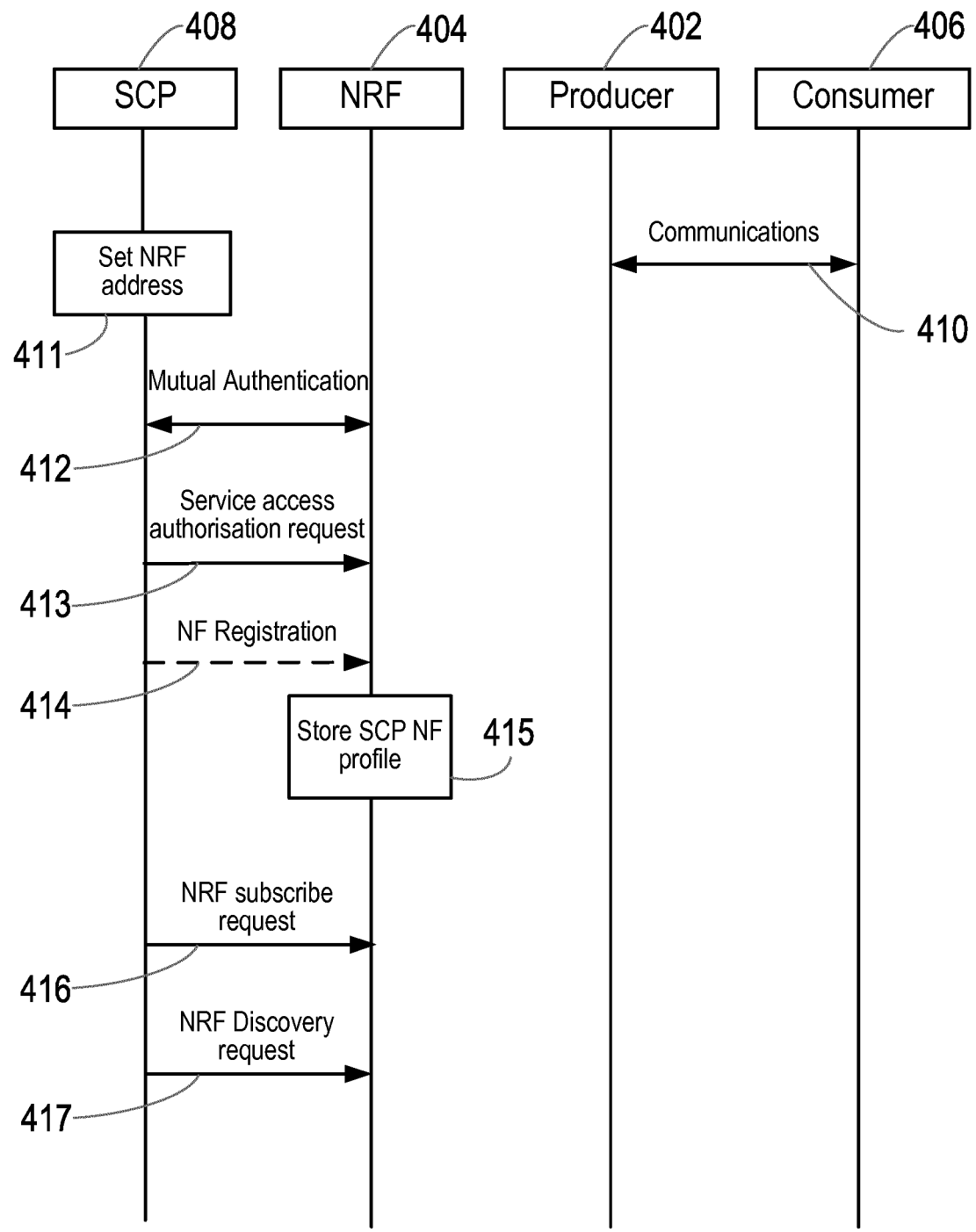
FIG. 4 is a signalling diagram illustrating the registration of an SCP with a NRF.
Figure 5:
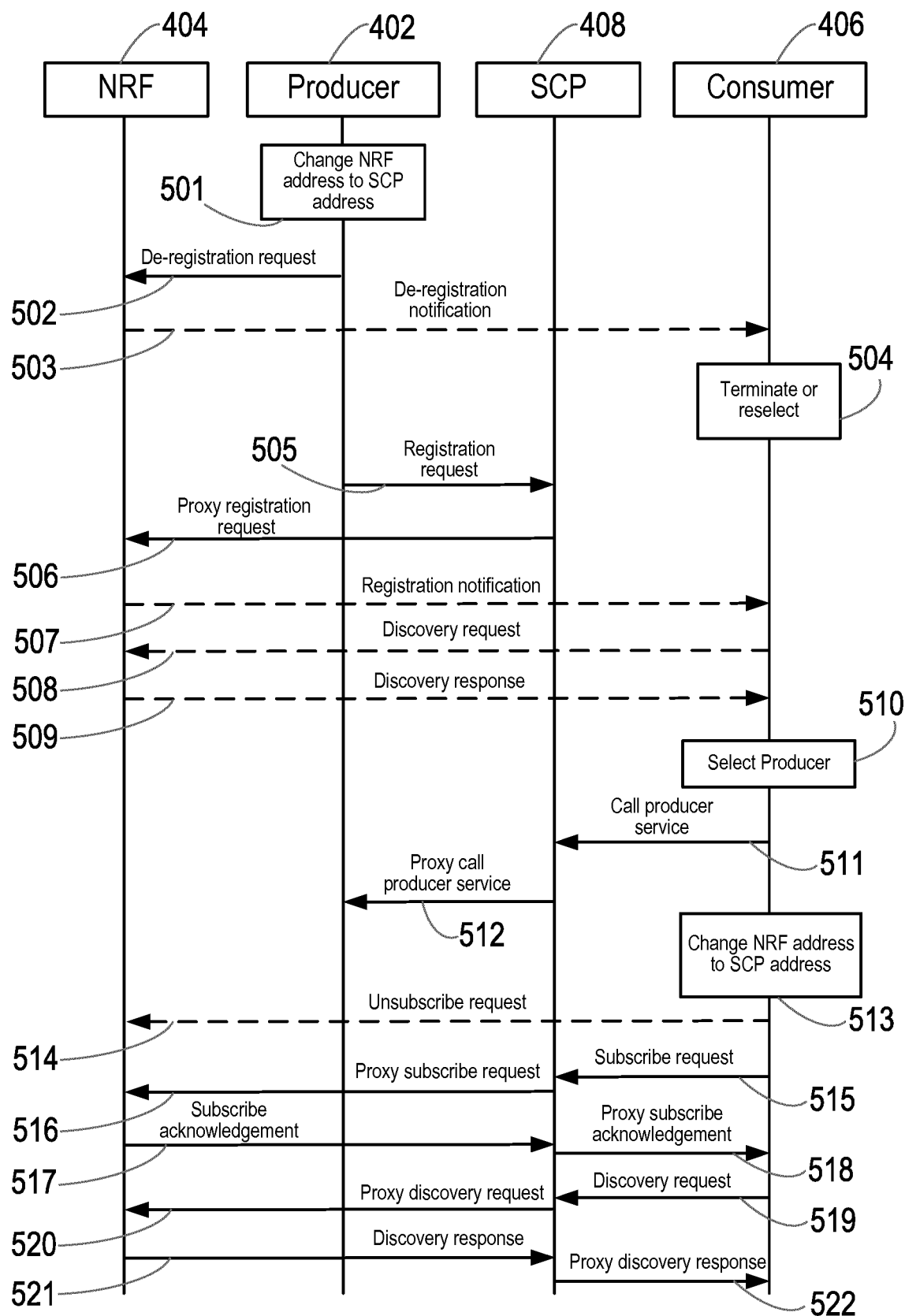
FIG. 5 is a signalling diagram illustrating a conventional migration from a direct communication mode to an indirect communication mode.

As noted above, when migrating from a direct communication mode to an indirect communication mode using the conventional techniques, the actions of the Producer means that for service consumers all services offered by the producers will become unavailable before they are registered again via the SCP. This will lead to service impacts due to Consumers being forced to perform a Producer re-selection or even release contexts. The signalling diagrams in FIGS. 4 and 5 show the registration of an SCP with a NRF in the conventional techniques (FIG. 4) and a conventional migration from a direct communication mode to an indirect communication mode (FIG. 5). All signalling shown in FIG. 4, FIG. 5 and the later signalling diagrams between the SCP, the first NF producer node, the first NF consumer node and the NRF can be via the appropriate interfaces in the service-based architecture. Where appropriate, the communications between the SCP, the first NF producer node, the first NF consumer node and the NRF 404 can be secured or authenticated via Transport Layer Security (TLS).

In FIG. 4, initially the services of a Producer node 402 are registered in an NRF 404, and a Consumer node 406 is making use of one or more of those services using direct communication mode B, as shown by signalling 410.

In step 411 the SCP 408 sets the NRF address. This step comprises the SCP 408 setting an NRF address to the address of the NRF 404. This address change can be initiated by an Operations, Administration and Management (OAM) part of the communication network.

Next, the SCP 408 and the NRF 404 mutually authenticate, as shown by signalling 412. This mutual authentication is via TLS, and can be initiated by a first request message sent from the SCP 408 to the NRF 404.

The SCP 408 then requests authorisation to access the services of the NRF 404, as shown by Service access authorisation request 413. The request for NRF service access authorisation can include an access token for the NRF 404, e.g. Nnrf_AccessToken (nfType=SCP, targetNFtype=NRF, scope=*).

Optionally, the SCP 408 can trigger registration of a NF profile for the SCP 408 in the NRF 404. This is shown by NF-registration request 414. The registration request from the SCP 408 can invoke the Nnrf_NFMgmt NFRegister service in NRF 404. The registration request can include registration information that may include an identity of the SCP 408, and an address of the SCP 408.

If the SCP 408 does optionally trigger registration of a NF profile for the SCP 408, the NRF 404 stores the NF profile for the SCP 408 (step 415). The storing of the NF profile for the SCP 408 means that the SCP instance is now discoverable by other NFs, including by other SCPs. Although not shown, the NRF 404 can send an acknowledgment to the SCP 408 indicating that the NF profile for the SCP 408 has been registered.

Next, the SCP 408 subscribes to changes for the NRF 404 so that the SCP 408 will be informed about changes to NF profiles stored by the NRF 404, or status changes of the NRF 404. This NRF subscription request is shown by signal 416, and can be, for example, a Nnrf_NFManagement_NFStatusSubscribe(NFType=NRF) request. Although not shown, the NRF 404 can send an acknowledgement of the subscription request to the SCP 408.

The SCP 408 sends a discovery request (signal 417) to the NRF 404 to perform NF discovery. The discovery request can be "Nnrf_NFDiscovery_with wildcarded_NFService-_name" so that the SCP 408 requests discovery of all NF instances (NRF Nfinstances) that the SCP 408 is permitted or allowed to detect. In response to the discovery request, the SCP 408 receives information on all NF instances in the network that it is allowed to detect (this response is not shown in FIG. 4). This can be useful where, for example, a hierarchical NRF is used.

As noted above, FIG. 5 shows exemplary signalling during a conventional migration from direct communication mode B to an indirect communication mode following the interaction of the SCP 408 with the NRF 404 as shown in FIG. 4.

The Producer node 402 stores an address of a NRF that it is to use for discovery of services from other NFs, and in which the NF profile of the Producer node 402 is stored. In the direct communication mode, this NRF address is the address of the NRF 404. At the start of the communication mode migration, in the Producer node 402 the stored NRF address (which is the service address of the NRF 404) is changed to or replaced by the service address of the SCP 408 (step 501). This address change can be initiated by an OAM part of the communication network.

Next, the Producer node 402 de-registers its NF profile from the NRF 404 as the previous NRF address is now invalid. The de-registration is initiated by the Producer node 402 sending a de-registration request 502 to the NRF having the old NRF address (i.e. the address of NRF 404). Although not shown in FIG. 5 the de-registration request may be sent via the SCP 408, which acts as a proxy towards the old NRF 604 on behalf of the Producer node 402.

For any Consumer node that has subscribed to notifications about status changes of the Producer node 402, the NRF 404 sends a notification (signal 503) that the Producer node 402 has de-registered from the NRF 404.

In step 504, as the producer instance that the Consumer node 406 is in direct communication with has been de-registered from the NRF 404, the Consumer node 406 either re-selects another producer instance or terminates the context.

Following the sending of the de-registration request (signal 502), the Producer node 402 sends a new registration request (signal 505) to register the NF profile of the Producer node 402 in a NRF. As the NRF address stored in the Producer node 402 has been replaced by the address of the SCP 408 (in step 501), the registration request is addressed to, and sent to, the SCP 408. The registration request indicates the service address of the Producer node 402 that is to be published and included in a stored NF profile.

On receipt of this registration request, the SCP 408 replaces the service address for the Producer node 402 specified in the registration request with the service address of the SCP 408, and forwards the modified registration request to the NRF 404. This is shown as 'Proxy Registration Request' 506 in FIG. 5.

Although not shown in FIG. 5, the NRF 404 then stores the NF profile for the Producer node 402 in the NRF 404, with that stored NF profile including the service address of the SCP 408 as the service address of the Producer node 402.

The NRF 404 then sends notifications to any Consumer node that has subscribed to notifications about status changes for the Producer node 402. This is shown by the 'Registration notification' signal 507. The notification indicates that a NF profile for the Producer node 402 has been registered at the NRF 404.

The Consumer node 406 may invoke a discovery request relating to the Producer node 402. This is shown by the 'Discovery request' signal 508. A discovery request may be sent to the NRF 404 regularly. The Consumer node 406 may send a discovery request regardless of whether the Consumer node 406 has subscribed to notifications about status changes for the Producer node 402. A response to discovery request 508 containing the requested information is shown as 'discovery response' 509.

Once the Consumer node 406 has the relevant updated information for the Producer node 402 (i.e. either via the notification from the NRF 404 or in response to a discovery request), the Consumer node 406 can select an appropriate Producer node to use for a requested service. This is shown as step 510.

Assuming Producer node 402 is selected, the Consumer node 406 obtains the service address for the Producer node 402 from the NF profile for the Producer node 402. As noted above, this service address is the SCP address.

The Consumer node 406 then sends a request for a particular service from the Producer node 402. This request ('call producer service' signal 511) is sent to the service address for the Producer node 402 obtained from the NF profile, i.e. it is sent to the SCP address.

The SCP 408 receives the call producer service signal 511, modifies the call producer service to include the actual service address of the Producer node 402, and sends the service request to the Producer node 402. This modified call producer service is referred to as 'proxy call producer service' signal 512.

In the direct communication mode the Consumer node 406 stores the address of the NRF 404 for use in discovering services of other NFs. As part of the communication mode migration, in the Consumer node 406 the stored NRF address (which is the service address of the NRF 404) is changed to or replaced by the service address of the SCP 408 (step 513). This address change can be initiated by an OAM part of the communication network.

Optionally, as a consequence of the invalidation of the old NRF address (i.e. the change or replacement of the address of the NRF 404), the Consumer node 406 may unsubscribe to status change notifications from the old NRF 404 (i.e. NRF 404). This unsubscribe request is shown as signal 514. Unsubscribing means that changes occurring to the producer NF instances will not be notified to the Consumer node 406.

In general, the SCP 408 is now able to act as a NRF towards the Producer node 402 and the Consumer node 406 and the SCP 408 'proxies' any requests to the NRF 404 and performs any required address modifications so further service invocations for the Producer node 402 will route via the SCP 408. From the point of view of the Consumer node 406, the SCP 408 is the proxy for all new requests, so all new requests are sent via the SCP 408. From the point of view of the SCP 408, if the SCP 408 receives requests it performs a stateless address modification to restore the addresses of the original Producer node 402 (and NRF 404) and routes the request accordingly. That is, if the request was for a service from an NRF, then the request is sent to NRF 404, and if the request was to a Producer node 402 (or another Producer node), it is routed accordingly.

In a specific example, in order for the Consumer node 406 to obtain the current information on producer services, the Consumer node 406 sends a new subscribe request (signal 515) for notifications on status changes. As the NRF address stored in the Consumer node 406 has been replaced by the address of the SCP 408 (in step 513), the subscribe request 515 is addressed to, and sent to, the SCP 408. The subscribe request identifies the Producer node 402 as a NF that the Consumer node 406 would like to receive status change notifications for, and a destination address that the notifications are to be sent to, namely the service address for the Consumer node 406.

On receipt of this subscribe request, the SCP 408 replaces the destination address (the service address for the Consumer node 406) specified in the subscribe request with the service address of the SCP 408, and forwards the modified subscribe request to the NRF 404. This is shown as 'Proxy Subscribe Request' 516 in FIG. 5.

The NRF 404 sends an acknowledgement of the subscription request to the SCP 408, as shown by 'subscribe acknowledgement' message 517. The SCP 408 replaces the destination address (the service address for the SCP 408) specified in the acknowledgement of the subscribe request with the service address of the Consumer node 406, and forwards the modified acknowledgement to the Consumer node 406. This is shown as 'Proxy Subscribe Acknowledgement' 518.

In order for the Consumer node 406 to discover NF instances that can provide a particular service, the Consumer node 406 can send a discovery request (signal 519) for information on suitable NF instances. This discovery request 519 can typically be sent following receipt of the proxy subscribe acknowledgement 518. As the NRF address stored in the Consumer node 406 has been replaced by the address of the SCP 408 (in step 513), the discovery request 519 is addressed to, and sent to, the SCP 408.

On receipt of this discovery request, the SCP 408 replaces the destination address (the service address for the Consumer node 406) specified in the discovery request with the service address of the SCP 408, and forwards the modified discovery request to the NRF 404. This is shown as 'Proxy Discovery Request' 520 in FIG. 5.

A response to the 'Proxy Discovery Request' 520 is provided by the NRF 404 to the SCP 408 in a 'Discovery Response' signal 521. The SCP 408 replaces the destination address (the service address for the SCP 408) specified in the discovery response with the service address of the Consumer node 406, and forwards the modified discovery response to the Consumer node 406. This is shown as 'Proxy Discovery Response' 522.

It will be appreciated that the order of the signalling shown in FIG. 5 is in part dependent on the timing of the occurrence of steps 501 and 513 by the OAM, and therefore the signalling and operations relating to the Consumer node 606 can occur earlier than shown and may overlap with some of the earlier signalling and operations by the Producer node 602 and/or SCP 608.

To address the issues with the conventional techniques in which for service consumers all services offered by the producers will become unavailable before they are registered again via the SCP 408, the techniques described herein propose a modified procedure for the migration to an indirect communication mode. In some embodiments, on the Producer side the behaviour can be changed in a way that when changing the NRF address it is possible to either skip sending the de-registration request to the old NRF, or, if this is not possible, to send the de-registration request to the old NRF via the SCP as proxy. In any case the Producer sends a registration to the new NRF via the SCP as a proxy. On the SCP side in handling the Producer registration, the SCP can be enhanced in a way that it discovers all nfProfiles of the Producer (this can either be for multiple nfTypes or one nfType only). This is done before the registration of the Producer via the SCP can be handled. So, when the Producer is reconfigured, and the SCP receives a nfRegister request, and the SCP can determine whether this Producer nfInstance is already known in the NRF. If so, the SCP modifies the nfRegister to a nfUpdate when sending it to the NRF. Thus, the NRF will get updated information about the service addresses in an existing nfProfile for the Producer instead of registering a new nfProfile for the Producer. The updated service addresses can be communicated to all Consumers as in Rel-15.

Figure 6:
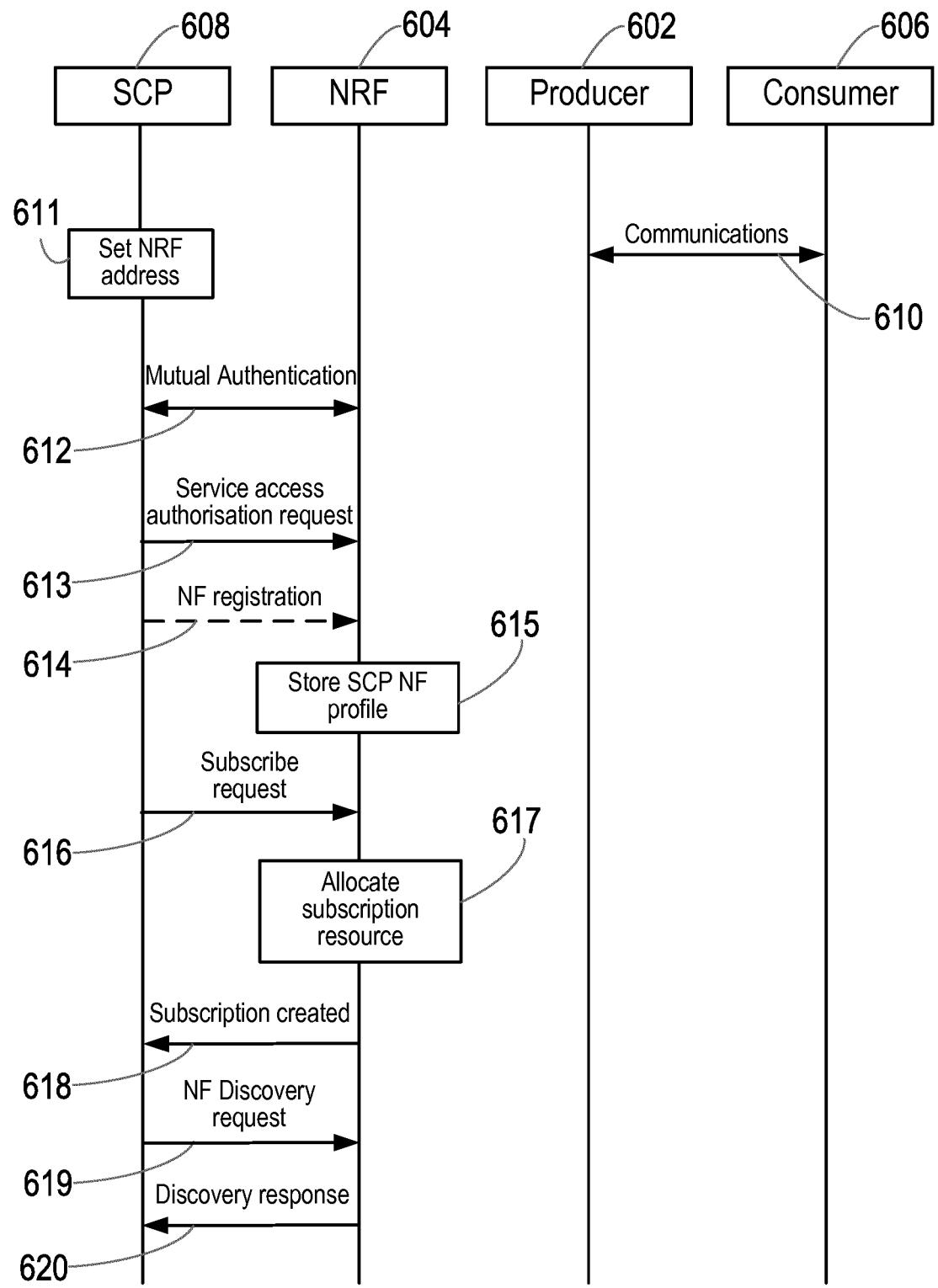
FIG. 6 is a signalling diagram illustrating the registration of an SCP with a NRF according to exemplary embodiments.
Figure 7:
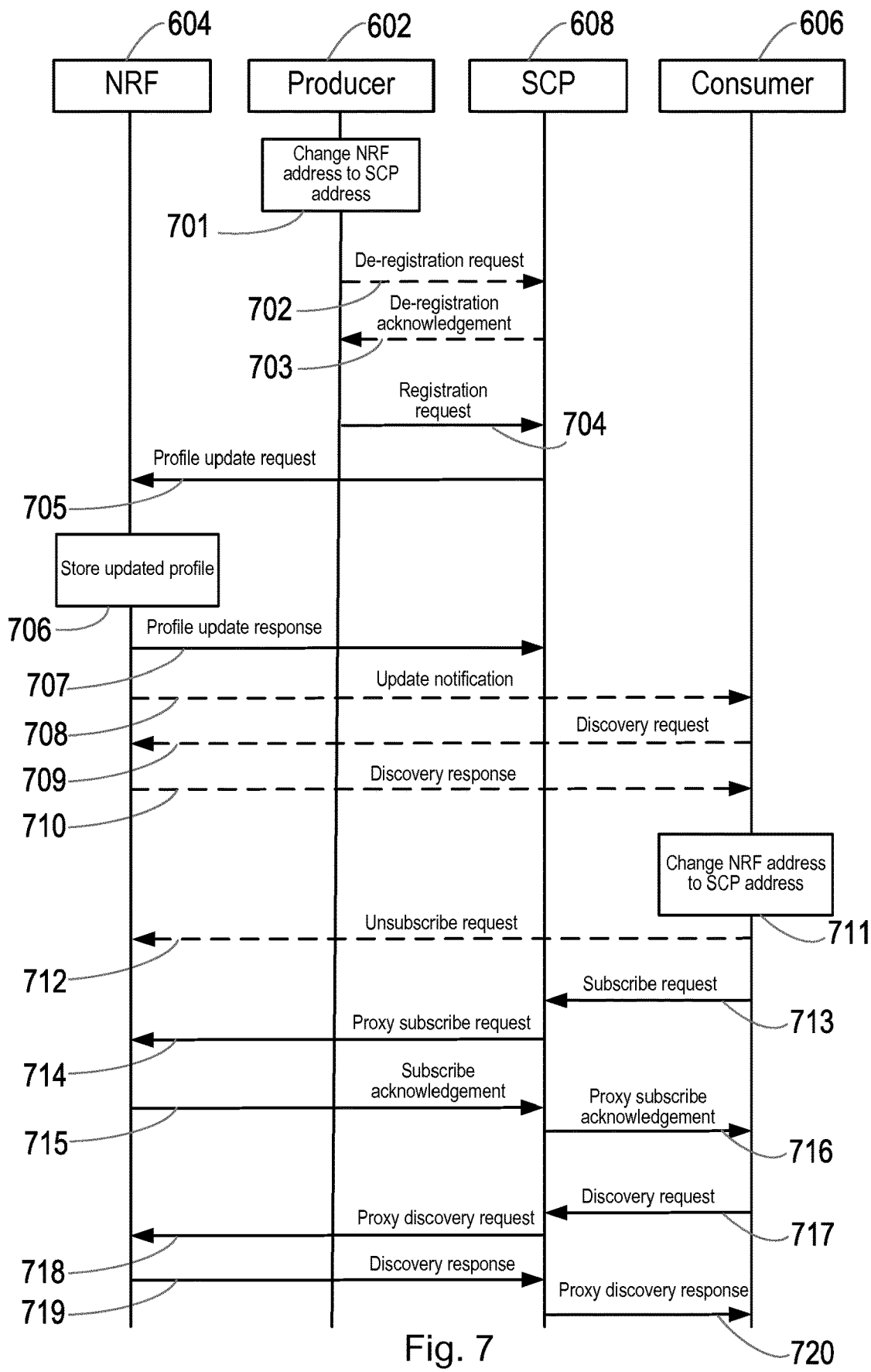
FIG. 7 is a signalling diagram illustrating a migration from a direct communication mode to an indirect communication mode according to exemplary embodiments.

The signalling diagrams in FIGS. 6 and 7 show the introduction of an SCP according to exemplary embodiments (FIG. 6) and exemplary embodiments of the migration from a direct communication mode to an indirect communication mode (FIG. 7). All signalling shown in FIG. 6 and FIG. 7 can be via the appropriate interfaces in the service-based architecture. Where appropriate, the communications between the SCP, the first NF producer node, the first NF consumer node and the NRF 404 can be secured or authenticated via Transport Layer Security (TLS).

In FIG. 6, initially the services of a Producer node 602 are registered in an NRF 604, and a Consumer node 606 is making use of one or more of those services using direct communication mode B, as shown by signalling 610. To improve the migration to an indirect communication mode via an SCP 608 according to the techniques described herein, the SCP 608 will communicate with the NRF 604, and the SCP 608 will need to be allowed or permitted to read and modify NF profiles of NF producers on their behalf. It is also useful for the SCP 608 to subscribe to changes to NF profiles of the NF producer, and of other NF producers. In some embodiments, the SCP 608 may also register in the NRF 604, i.e. a NF profile for the SCP 608 is stored by the NRF 604, although this registration is not always required.

In step 611 the SCP 608 sets the NRF address. This step comprises the SCP 608 setting an NRF address to the address of the NRF 604. This address setting can be initiated by an OAM part of the communication network.

Next, the SCP 608 and the NRF 604 mutually authenticate, as shown by signalling 612. This mutual authentication is via TLS, and can be initiated by a first request message sent from the SCP 608 to the NRF 604.

The SCP 608 then requests authorisation to access the services of the NRF 604, as shown by Service access authorisation request 612. The request for NRF service access authorisation can include an access token for the NRF 604, e.g. Nnrf_AccessToken (nfType=SCP, targetNFtype=NRF, scope=*).

Optionally, the SCP 608 can trigger registration of a NF profile for the SCP 608 in the NRF 604. This is shown by NF-registration request 614. The registration request from the SCP 608 can invoke the Nnrf_NFMgmt NFRegister service in NRF 604. The registration request can include registration information that may include an identity of the SCP 608, and an address of the SCP 608.

If the SCP 608 does optionally trigger registration of a NF profile for the SCP 608, the NRF 604 stores the NF profile for the SCP 608 (optional step 615). The storing of the NF profile for the SCP 608 means that the SCP instance is now discoverable by other NFs, including by other SCPs. Although not shown, the NRF 604 can send an acknowledgement to the SCP 608 indicating that the NF profile for the SCP 608 has been registered.

Optionally, but preferably, the SCP 608 subscribes to changes in the services in the Producer node 602 so that the SCP 608 will be informed by the NRF 604 about changes to the services provided by the Producer node 602. This NRF subscription request is shown by signal 616, and can be, for example, a Nnrf_NFManagement_NFStatusSubscribe (reqNFType=SCP,targetNFType=Prod) request. It is possible for the SCP 608 to omit a subscrCond attribute in the subscribe request in order to receive notifications for all NFs having profiles stored in the NRF 604 (i.e. including at least the Producer node 602 and Consumer node 606).

In response to the subscribe request 616, the NRF 604 allocates subscription resources to the requested subscription (step 617), according to the requested SubscriptionData, with the subscription identified by a subscriptionId, and sends a subscription created message 618 to the SCP 608 to indicate that the requested subscription has been created. The subscription created message 618 can include the subscriptionId identifying the created subscription resource. In this way the SCP 608 will be informed about any changes to the services of the Producer node 602.

In order for the SCP 608 to obtain a current view of the available producer services, the SCP 608 sends a discovery request (signal 619) to the NRF 604 to perform NF discovery. The discovery request can be "Nnrf_NFDiscovery_NF-Discover(requester-nf-type=SCP,target-nf-type=Prod)" so that the SCP 608 requests discovery of all NF instances (NF Producer Nfinstances). In response to the discovery request, the SCP 608 receives information on all NF instances in the network (shown as discovery response 620 in FIG. 6).

Using the above procedure in the SCP 608 and NRF 604, the SCP 608 is able to create and maintain an up to date topology map of available producer services. This is useful for enabling a more seamless migration from a direct communication mode to an indirect communication mode.

FIG. 7 shows signalling during a migration from direct communication mode B to an indirect communication mode according to exemplary embodiments following the introduction of the SCP 608 as shown in FIG. 6. It should be appreciated from the description below that the migration requires two, largely independent, main sets of actions. A first set of steps/signalling relates to the migration on the Producer node 602 side, which are presented as steps/signals 701-707 and which are triggered by step 701, and the other set of steps/signalling relates to the migration on the Consumer node 606 side, which are presented as steps/signals 711-720 and which are triggered by step 711. Moreover, the timing of some of the signalling shown in FIG. 7 can be in part dependent on the timing of certain actions by an OAM.

Initially, the Producer node 602 stores an address of a NRF that it is to use for discovery of services from other NFs, and in which the NF profile of the Producer node 602 is stored. In the direct communication mode, this NRF address is the address of the NRF 604. At the start of the communication mode migration, in the Producer node 602 the stored NRF address (which is the service address of the NRF 604) is changed to or replaced by the service address of the SCP 608 (step 701). This address change can be initiated by an OAM part of the communication network.

The next action(s) depends on the behaviour or implementation of the Producer node 602. A NF de-registers its NF profile from the NRF 604 as the previous NRF address is now invalid. Therefore the NF may be required to send a de-registration request in order to de-register with the previous NRF. Thus, the Producer node 602 may send a de-registration request 702 for the NRF 604 via the SCP 608.

This de-registration request 702 is intended for the NRF having the old NRF address (i.e. the address of NRF 604).

If the SCP 608 receives a de-registration request 702 from the Producer node 602, the SCP 608 sends an acknowledgement of the request to the Producer node 602 (this is shown as acknowledgement 703), but the SCP 608 does not forward the de-registration request to the NRF 604. The acknowledgement sent to the Producer node 602 indicates to the Producer node 602 that the de-registration request has been actioned (although it has not and the NF profile for the Producer node 602 remains with the NRF 604).

In some embodiments, the Producer node 602 can be configured to skip or omit the sending of the de-registration request when the previous NRF address is now invalid.

Regardless of whether the Producer node 602 is required to (or does) send a de-registration request in response to a change in the NRF address, the Producer node 602 sends a new registration request (signal 704) to register the NF profile of the Producer node 602 in a NRF. As the NRF address stored in the Producer node 602 has been replaced by the address of the SCP 608 (in step 701), the registration request is addressed to, and sent to, the SCP 608. The registration request 704 indicates the service address of the Producer node 602 that is to be published and included in a stored NF profile. The registration request may register the NFInstance of the Producer node 602 (using the same NfInstance ID as towards previous NRF 604) to the new NRF 604 using Nnrf_NFManagement_N FRegister (nfInstanceID=ProdInst,nfType=Prod, nfStatus=REGISTERED).

On receipt of this registration request, as the NF profile for the Producer node 602 has not been deleted or de-registered from the NRF 604, if the SCP 608 has profile information available for the Producer node 602 identified in the registration request, the SCP 608 creates a profile update request that includes the information for the Producer node 602, with the service address for the Producer node 602 replaced by the service address of the SCP 608. The profile update request is then sent to the NRF 604. This is shown as 'Profile update request' 705 in FIG. 7.

In particular embodiments of the creation and sending of the profile update request, if the nfInstanceID specified in the received registration request is known in the topology information obtained by the SCP 608 (ensured by the uniqueness of the universally unique identifier, UUID), then the SCP 608 changes the NFRegister message to an NFUpdate message to effect the required address modifications to the nfProfile stored by the NRF 604. With the profile update request, the SCP 608 can either request a partial update (e.g. http PATCH) of the NF profile of the Producer node 602 or request a complete replacement (e.g. http PUT) of the stored NF profile for the Producer node 602 with a new NF profile. Either way, the resulting stored NF profile will note that a service address for the Producer node 602 is the service address of the SCP 608. The profile update request may be a Nnrf_NFManagement_NFUpdate(nfInstanceID=ProdInst, nfType=Prod,nfStatus=REGISTERED) request.

The NRF 604 then updates or stores the NF profile for the Producer node 602 in the NRF 604 (step 706), with that stored NF profile including the service address of the SCP 608 as the service address of the Producer node 602. The NF profile (with the SCP 608 address as the service address for the Producer node 602) is now available for discovery by any potential Consumers. The NRF 604 can then send an acknowledgement to the SCP 608 ('profile update response' 707) indicating that the NF profile for the Producer node 602 has been updated.

Thus, with profile update request 705 and step 706, the SCP 608 places itself as a proxy in the communication path between the Consumer node 606 and the Producer node 602.

For any consumer node that has subscribed to notifications about status changes of the Producer node 602, the NRF 604 will send an update notification message (signal 708) to the consumer node(s) indicating that the NF profile for the Producer node 602 has been updated, and the update notification message 708 will indicate the new service address for the Producer node 602 (i.e. the address of the SCP 608). The update notification message 708 may be a NFStatusNotify message.

The Consumer node 606 may invoke a discovery request relating to the Producer node 602. This is shown by the 'Discovery request' signal 709. A discovery request may be regularly sent to the NRF 604. The Consumer node 606 may send a discovery request regardless of whether the Consumer node 606 has subscribed to notifications about status changes for the Producer node 602. For example the Consumer node 606 may consider previously-received information about the Producer node 602 to expire after a certain amount of time, and a new discovery request may be sent once that information has expired.

The discovery request 709 is received at the NRF 604, the NRF 604 obtains the information for the Producer node 602 indicated in the discovery request 709, and the NRF 604 sends a discovery response 710 containing the requested information to the Consumer node 606.

It will be appreciated that the sending of a discovery request and the discovery response in signals 709 and 710 is independent on the receipt (or lack thereof) of a profile update notification 708 relating to the Producer node 602, and thus discovery request 709 may be sent at any time so that the Consumer node 606 can update its information about the Producer node 602 and/or other available Producer nodes.

Now that the Consumer node 606 has the relevant updated information for the Producer node 602 (i.e. either via the profile update notification from the NRF 604 or in response to a discovery request), any new requests for the Producer node 602 will be sent to the Producer node 602 using the service address of the SCP 608. The first message sent by the Consumer node 606 to the Producer node 602 after the profile update will trigger a mutual authentication (handshake) procedure between the SCP 608 and the Consumer node 606, e.g. via TLS.

Thus, at this stage of the procedure/technique, from the point of view of the Consumer node 606, the SCP 608 has been successfully set up as a NRF proxy for the Producer node 602 without causing any disruption or interruptions for the Consumer node 606.

The other part of the procedure/technique in migrating to the indirect communication mode involves setting the Consumer node 606 up to communicate with the NRF 604 via the SCP 608 as well.

In the direct communication mode the Consumer node 606 stores the address of the NRF 604 for use in discovering services of other NFs. As part of the communication mode migration, in the Consumer node 606 the stored NRF address (which is the service address of the NRF 604) is changed to or replaced by the service address of the SCP 608 (step 711). This address change can be initiated by an OAM part of the communication network.

Optionally, as a consequence of the invalidation of the old NRF address (i.e. the change or replacement of the address of the NRF 604), the Consumer node 606 may unsubscribe to status change notifications from the old NRF 604 (i.e.

NRF 604). This unsubscribe request is shown as signal 712. Unsubscribing means that changes occurring to the producer NF instances will not be notified to the Consumer node 606. In general, the SCP 608 is now able to act as a NRF towards the Producer node 602 and the Consumer node 606 and the SCP 608 'proxies' any requests to the NRF 604 and performs any required address modifications so further service invocations for the Producer node 602 will route via the SCP 608. From the point of view of the Consumer node 606, the SCP 608 is the proxy for all new requests, so all new requests are sent via the SCP 608. From the point of view of the SCP 608, if the SCP 608 receives requests it performs an address modification to restore the addresses of the original Producer node 602 (and NRF 604) and routes the request accordingly. This address modification is optionally, but preferably, stateless. That is, if the request was for a service from an NRF, then the request is sent to NRF 604, and if the request was to a Producer node 602 (or another Producer node), it is routed accordingly.

After unsubscribing to status change notifications from the NRF 604, in order for the Consumer node 606 to obtain the current information on producer services, the Consumer node 606 sends a new subscribe request (signal 713) for notifications on status changes. As the NRF address stored in the Consumer node 606 has been replaced by the address of the SCP 608 (in step 711), the subscribe request 713 is addressed to, and sent to, the SCP 608. The subscribe request may identify the Producer node 602 as a NF that the Consumer node 606 would like to receive status change notifications for (or alternatively identify a type of NF, such as SMF, that the Consumer node 606 would like to receive status change notifications for), and a destination address that the notifications are to be sent to namely the service address for the Consumer node 606.

On receipt of this subscribe request, the SCP 608 replaces the destination address (the service address for the Consumer node 606) specified in the subscribe request with the service address of the SCP 608, and forwards the modified subscribe request to the NRF 604. This is shown as 'Proxy Subscribe Request' 714 in FIG. 7.

The NRF 604 sends an acknowledgement of the subscription request to the SCP 608, as shown by 'subscribe acknowledgement' message 715. The SCP 608 replaces the destination address (the service address for the SCP 608) specified in the subscribe acknowledgement message 715 with the service address of the Consumer node 606, and forwards the modified acknowledgement to the Consumer node 606. This is shown as 'Proxy Subscribe Acknowledgement' 716.

In order for the Consumer node 606 to discover NF instances that can provide a particular service, the Consumer node 606 can send a discovery request (signal 717) for information on suitable NF instances. This discovery request 717 can typically be sent following receipt of the proxy subscribe acknowledgement 716. As the NRF address stored in the Consumer node 606 has been replaced by the address of the SCP 608 (in step 711), the discovery request 717 is addressed to, and sent to, the SCP 608.

On receipt of this discovery request, the SCP 608 replaces the destination address (the service address for the Consumer node 606) specified in the discovery request with the service address of the SCP 608, and forwards the modified discovery request to the NRF 604. This is shown as 'Proxy Discovery Request' 718 in FIG. 7.

A response to the 'Proxy Discovery Request' 718 is provided by the NRF 604 to the SCP 608 in a 'Discovery Response' signal 719. The SCP 608 replaces the destination address (the service address for the SCP 608) specified in the discovery response with the service address of the Consumer node 606, and forwards the modified discovery response to the Consumer node 606. This is shown as 'Proxy Discovery Response' 720. After this discovery procedure, the Consumer node 606 uses the services of the NRF 604 indirectly via the SCP 608.

Although FIG. 7 shows the discovery request 717 being sent after the subscribe request 713, it will be appreciated that it is possible for the discovery request 717 to be sent before the subscribe request 713.

Thus it can be seen that with small modifications to the behaviour of the Producer node 602 and the SCP 608, it is possible to migrate from a direct communication mode to an indirect communication mode without interrupting the ability of a Consumer node 606 to consume a producer's services. As noted above, a Producer node 602 may be configured to skip or omit de-registration from an NRF in the event that the NRF address is changed, and a Producer node 602 may allow the SCP 608 to discover the services of the Producer node 602. Also as noted above, a SCP 608 may be configured to discover or obtain the NF profiles for the Producer node 602 from the NRF 604 and subscribe to changes in those profiles. The SCP 608 translates a profile registration request (e.g. NFRegister) received from the Producer node 602 to a profile update (e.g. NFUpdate) before passing it on to the NRF 604.

Figure 8:
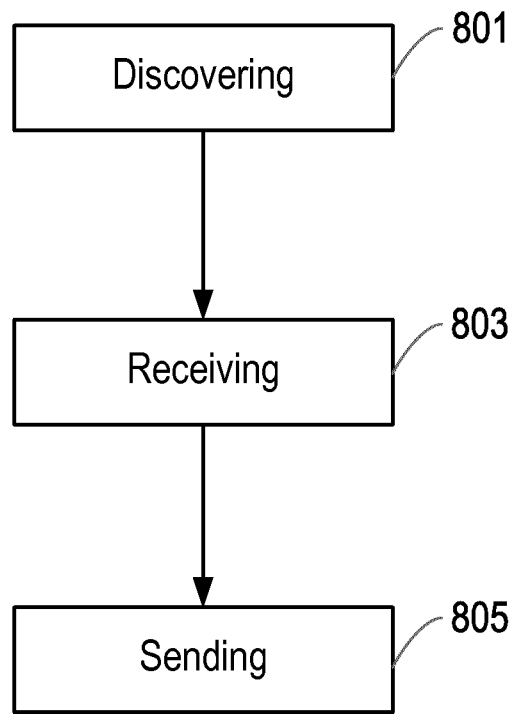
FIG. 8 is a flow chart illustrating an exemplary method of operating an SCP node.

The flow chart in FIG. 8 shows an exemplary method of operating a SCP node 608 in a communication network as a proxy NRF node 604 for a first NF producer node 602 in the communication network according to the techniques presented herein. The techniques are to be used when the first NF producer node 602 is to migrate from a direct communication mode with a first NF consumer node 606 to an indirect communication mode via the SCP node 608.

In a first step, step 801, the SCP node 608 discovers a NF profile for the first NF producer node 602. The NF profile for the first NF producer node is stored by the NRF node 604, and the NF profile comprises a service address for the first NF producer node. The NF profile for the first NF producer node may also comprise an indication of one or more services provided by the first NF producer node 602.

In some embodiments step 801 comprises sending a discovery request to the NRF node 604 that requests discovery of the NF profile for the first NF producer node 602. This corresponds to the NF discovery request 617 in FIG. 6. The SCP node 608 receives a discovery response from the first NRF node that comprises the NF profile for the first NF producer node 602.

In step 803, the SCP node 608 receives a registration request from the first NF producer node 602. This registration request is a request to register a NF profile for the first NF producer node 602 at the NRF node 604, and the registration request indicates the service address for the first NF producer node 602. This corresponds to the registration request 704 in FIG. 7. The registration request is sent by the first NF producer node 602 following the updating of the NRF address stored by the first NF producer node 602 to the address of the SCP node 608.

In step 805, in response to the received registration request, the SCP node 608 sends an update request to the NRF node 604 to update the NF profile for the first NF producer node 602 stored by the NRF node 604 to replace the service address of the first NF producer node 602 with a first service address of the SCP node 608 that is associated with the service address of the first NF producer node. The first service address of the SCP node 608 may be the address for the SCP node 608, or it may be one of a plurality of addresses for the SCP node 608 node. In the latter case, the SCP node 608 may have allocated or associated one or more of the plurality of addresses to the first NF producer node 602. This step corresponds to profile update request 705 in FIG. 7.

Thus, the above actions or operations of the SCP node 608 mean that the first NF producer node 602 is not de-registered from the NRF node 604, which avoids disruption to services provided to first NF consumer node 606.

In some embodiments prior to step 801 the SCP node 608 can send a subscription request to the NRF node 604 to subscribe to changes in services of the first NF producer node 602. This step corresponds to subscription request 616 in FIG. 6. As noted above, the subscription request may be used to subscribe to changes in services of all NF producer nodes for which NF profiles are stored by the NRF node 604.

In some embodiments, prior to step 803, the SCP node 608 may receive a de-registration request from the first NF producer node 602, with the de-registration request requesting that the first NF producer node 602 is de-registered from the NRF node 604. This step corresponds to de-register request 702 in FIG. 7.

In some embodiments, in response to the received de-registration request the SCP node 608 can send an acknowledgement to the first NF producer node 602. This step corresponds to de-registration acknowledge 703 in FIG. 7. In this way, the first NF producer node 602 considers the de-registration request to have been actioned. However, the SCP node 608 does not send a corresponding de-registration request to the NRF node 604 on behalf of the first NF producer node 602, which means that the first NF producer node 602 remains registered with the NRF node 604.

In alternative embodiments, in response to the received de-registration request the SCP node 608 can determine if the de-registration request comprises an indicator relating to whether the first NF producer node 602 is to change to a different NRF node. This indicator can be used by the first NF producer node 602 and/or the SCP node 608 to determine whether the de-registration is a 'normal' de-registration from the NRF node 604 (i.e. it does not occur during, or it does not relate to, a migration from a direct communication mode to an indirect communication mode), in which case the de-registration request should be passed on to the NRF node 604. In some embodiments if the received de-registration request does comprise the indicator, then the SCP node 608 does not send a de-registration request to the NRF node 604. In these embodiments if the received de-registration request does not comprise the indicator, the SCP node 608 sends a de-registration request to the NRF node 604, in order to request de-registration of the first NF producer node 602 from the NRF node 604. Those skilled in the art will be aware of various alternative ways in which a producer node can signal that a de-registration request is a 'normal' de-registration and should be actioned by the SCP node 608.

In other alternative embodiments, following receipt of the de-registration request and the sending of the de-registration acknowledge 703 by the SCP node 608, the SCP node 608 can determine whether the registration request received in step 803 is received from the first NF producer node 602 within a predetermined time period of receipt of the de-registration request. This delay in actioning the de-registration request enables the SCP node 608 to observe whether there is an attempt to register the same NF instance shortly afterwards. If the registration request is not received within the predetermined time period, then the SCP node 608 sends the de-registration request to the NRF node 604 to request the de-registration of the first NF producer node 602 from the NRF node 604. Otherwise, in response to the registration request being received within the predetermined time period, the SCP node 608 does not send a de-registration request to the NRF node 604 on behalf of the first NF producer node 602.

In some embodiments step 805 comprises sending an update request that is a request to replace the stored NF profile for the first NF producer node 602 with a new NF profile that has the first service address of the SCP node as the service address of the first NF producer node.

In some embodiments, in response to receiving the registration request in step 803, the SCP node 608 can determine whether a NF profile for the NF producer node identified in the registration request has been discovered from the NRF node 604.

Step 805 is performed if the NF profile for the NF producer node identified in the registration request has been discovered from the NRF node 604.

In some embodiments, prior to step 801, the SCP node 608 can send an authorisation request to the NRF node 604 to request authorisation to access service information about NF producer nodes stored by the NRF node 604. This corresponds to the service access authorisation request 613 in FIG. 6.

In some embodiments the NF profile discovered in step 801 may indicate that the first NF producer node 602 is capable of providing at least a first service to consumer nodes. The SCP node 608 may receive a service request from a second NF consumer node that requests a first service to be provided to the second NF consumer node. The SCP node 608 identifies from the discovered NF profile that the first NF producer node 602 is capable of providing the first service, and the SCP node 608 sends the service request received from the second NF consumer node to the first NF producer node 602 using the service address of the first NF producer node 602 in the discovered NF profile. The SCP node 608 then handles further communications relating to the provision of the first service between the first NF producer node 602 and the second NF consumer node in line with the indirect modes of communication.

Figure 9:
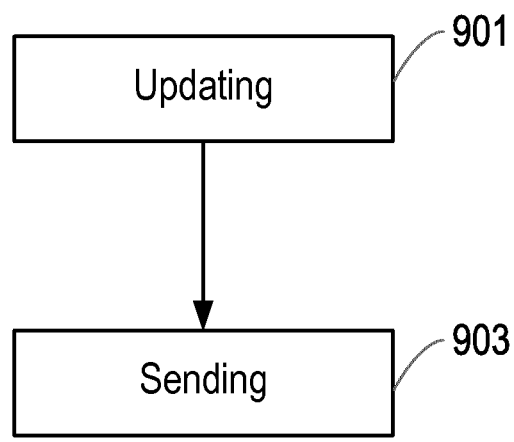
FIG. 9 is a flow chart illustrating an exemplary method of operating a Producer node.

The flow chart in FIG. 9 shows an exemplary method of operating a first NF producer node 602 in a communication network. The first NF producer node 602 is to migrate from a direct communication mode with a first NF consumer node 606 to an indirect communication mode via SCP node 608.

In step 901, the first NF producer node 602 updates a stored service address for NRF node 604 to a service address of the SCP node. The NRF node 604 currently stores a NF profile for the first NF producer node. Step 901 corresponds to step 701 in FIG. 7.

In step 903 the first NF producer node 602 sends a registration request to the SCP node in order to request the registration of a NF profile for the first NF producer node 602 at the SCP node. Step 903 corresponds to step 704 in FIG. 7.

In some embodiments, prior to step 903, the first NF producer node 602 sends a de-registration request to the SCP node 608 to request de-registration of the first NF producer node 602 from the NRF node 604. This de-registration request corresponds to signal 702 in FIG. 7. The first NF producer node 602 may then receive an acknowledgement of the first de-registration request from the SCP node 608. This de-registration acknowledgement corresponds to signal 703 in FIG. 7.

In some embodiments the first NF producer node 602 includes an indicator in the de-registration request of whether the first NF producer node 602 is to change to a different NRF node 604. This enables the first NF producer node 602 to indicate that de-registration is required in a 'normal' de-registration situation, i.e. not related to a migration or change from a direct communication mode to an indirect communication mode.

In some embodiments the method further comprises the first NF producer node 602 receiving a service request from the SCP node 608 for a first service to be provided by the first NF producer node 602 to a second NF consumer node.

In some embodiments the method further comprises, after step 903, sending and/or receiving, via the SCP node 608, communications relating to a service provided by the first NF producer node 602 to the first NF consumer node 606.

Figure 10:
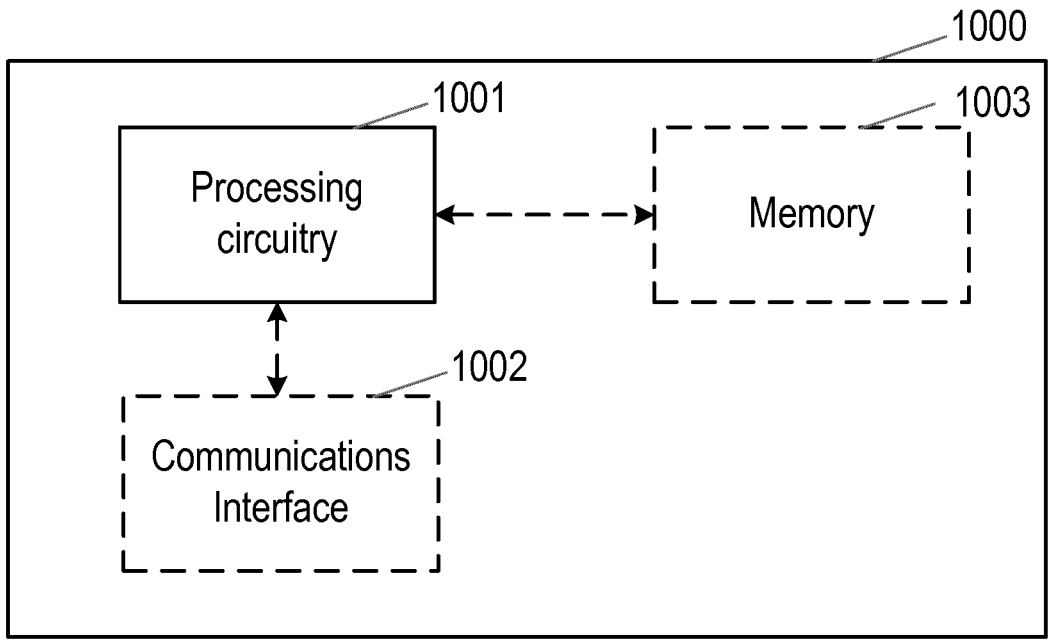
FIG. 10 shows a SCP node comprising processing circuitry (or logic)

FIG. 10 illustrates a SCP node 1000 comprising processing circuitry (or logic) 1001. The SCP node 1000 may comprise or be the SCP node 608 described above. Thus the SCP node 1000 is to enable a migration from a direct communication mode to an indirect communication mode that minimises disruption for an existing service consumer.

It will be appreciated that the SCP node 1000 may comprise one or more virtual machines running different software and/or processes. The SCP node 1000 may therefore comprise one or more servers, switches and/or storage devices and/or may comprise cloud computing infrastructure that runs the software and/or processes.

The processing circuitry 1001 controls the operation of the SCP node 1000 and can implement the methods described herein in relation to SCP node 608. The processing circuitry 1001 can comprise one or more processors, processing units, multi-core processors or modules that are configured or programmed to control the SCP node 1000 in the manner described herein. In particular implementations, the processing circuitry 1001 can comprise a plurality of software and/or hardware modules that are each configured to perform, or are for performing, individual or multiple steps of the method described herein in relation to SCP node 608.

In some embodiments, the SCP node 1000 may optionally comprise a communications interface 1002. The communications interface 1002 of the SCP node 1000 can be for use in communicating with other nodes, such as other virtual nodes. For example, the communications interface 1002 of the SCP node 1000 can be configured to transmit to and/or receive from other nodes or network functions requests, resources, information, data, signals, or similar. The processing circuitry 1001 of SCP node 1000 may be configured to control the communications interface 1002 of the SCP node 1000 to transmit to and/or receive from other nodes or network functions requests, resources, information, data, signals, or similar.

Optionally, the SCP node 1000 may comprise a memory 1003. In some embodiments, the memory 1003 of the SCP node 1000 can be configured to store program code that can be executed by the processing circuitry 1001 of the SCP node 1000 to perform the method described herein in relation to the SCP node 608. Alternatively or in addition, the memory 1003 of the SCP node 1000, can be configured to store any requests, resources, information, data, signals, or similar that are described herein. The processing circuitry 1001 of the SCP node 1000 may be configured to control the memory 1003 of the SCP node 1000 to store any requests, resources, information, data, signals, or similar that are described herein.

Briefly, in embodiments, the SCP node 1000, or the processing circuitry 1001 of the SCP node 1000, in conjunction or cooperation with the communications interface 1002 and/or memory 1003 (as appropriate), can be configured to discover a NF profile for a first NF producer node 602 that is stored by a NRF node 604, receive a registration request from the first NF producer node 602 to register a NF profile for the first NF producer node 602 at the NRF node 604, and, in response to the received registration request, send an update request to the NRF node 604 to update the NF profile for the first NF producer node 602 to replace the service address of the first NF producer node 602 with a first service address of the SCP node 1000 that is associated with the service address of the first NF producer node.

The processing circuitry 1001 can be further configured to operate according to the various other embodiments of the SCP node 608 described above with reference to FIGS. 6 and 7.

Figure 11:
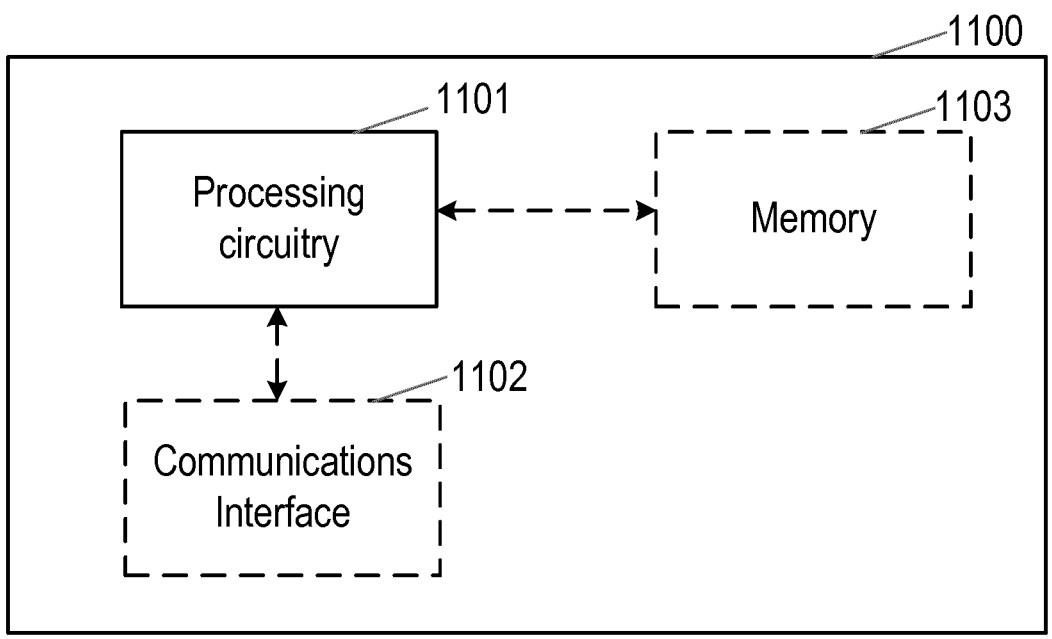
FIG. 11 shows a Producer node comprising processing circuitry (or logic).

FIG. 11 illustrates a first NF producer node 1100 comprising processing circuitry (or logic) 1101. The first NF producer node 1100 may comprise or be the first NF producer node 602 described above. Thus the first NF producer node 1100 is to migrate from a direct communication mode with a first NF consumer node 606 to an indirect communication mode via SCP node 608.

It will be appreciated that the first NF producer node 1100 may comprise one or more virtual machines running different software and/or processes. The first NF producer node 1100 may therefore comprise one or more servers, switches and/or storage devices and/or may comprise cloud computing infrastructure that runs the software and/or processes.

The processing circuitry 1101 controls the operation of the first NF producer node 1100 and can implement the methods described herein in relation to first NF producer node 602. The processing circuitry 1101 can comprise one or more processors, processing units, multi-core processors or modules that are configured or programmed to control the first NF producer node 1100 in the manner described herein. In particular implementations, the processing circuitry 1101 can comprise a plurality of software and/or hardware modules that are each configured to perform, or are for performing, individual or multiple steps of the method described herein in relation to the first NF producer node 602.

In some embodiments, the first NF producer node 1100 may optionally comprise a communications interface 1102. The communications interface 1102 of the first NF producer node 1100 can be for use in communicating with other nodes, such as other virtual nodes. For example, the communications interface 1102 of the first NF producer node 1100 can be configured to transmit to and/or receive from other nodes or network functions requests, resources, information, data, signals, or similar. The processing circuitry 1101 of the first NF producer node 1100 may be configured to control the communications interface 1102 of the first NF producer node 1100 to transmit to and/or receive from other nodes or network functions requests, resources, information, data, signals, or similar.

Optionally, the first NF producer node 1100 may comprise a memory 1103. In some embodiments, the memory 1103 of the first NF producer node 1100 can be configured to store program code that can be executed by the processing circuitry 1101 of the first NF producer node 1100 to perform the method described herein in relation to the first NF producer node 602. Alternatively or in addition, the memory 1103 of the first NF producer node 1100, can be configured to store any requests, resources, information, data, signals, or similar that are described herein. The processing circuitry 1101 of the first NF producer node 1100 may be configured to control the memory 1103 of the first NF producer node 1100 to store any requests, resources, information, data, signals, or similar that are described herein.

Briefly, in embodiments, the first NF producer node 1100, or the processing circuitry 1101 of the first NF producer node 1100, in conjunction or cooperation with the communications interface 1102 and/or memory 1103 (as appropriate), can be configured update a stored service address for NRF node 604 to a service address of the SCP node 608, and send a registration request the SCP node 608 to register a NF profile for the first NF producer node 602 at the SCP node 608.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of operating a Service Communication Proxy (SCP) node in a communication network as a proxy network repository function (NRF) for a first network function (NF) producer node in the communication network, wherein the first NF producer node is to migrate from a direct communication mode with a first NF consumer node to an indirect communication mode with the first NF consumer node via the SCP, wherein the method in the SCP node comprises:
  receiving a registration request from the first NF producer node, wherein the registration request is a request to register a NF profile for the first NF producer node at the SCP node, wherein the NF profile indicates a service address for the first NF producer node;
  in response to the received registration request, determining that the NF profile for the first NF producer node is currently registered with a first NRF node in the communication network;
  in response to the determination, sending an update request to the first NRF node to update the NF profile currently registered for the first NF producer node stored by the first NRF node, to replace the service address of the first NF producer node stored by the first NRF node with a first service address of the SCP node; and
  prior to the determination, sending an authorisation request to the first NRF node to request authorisation to access service information of NF producer nodes stored by the first NRF node.

2. A Service Communication Proxy (SCP) node for use in a communication network as a proxy network repository function (NRF) for a first network function (NF) producer node in the communication network, wherein the first NF producer node is to migrate from a direct communication mode with a first NF consumer node to an indirect communication mode with the first NF consumer node via the SCP, wherein the SCP node comprises processing circuitry and a memory, said memory containing instructions executable by said processing circuitry, whereby said SCP node is operative to:
  receive a registration request from the first NF producer node, wherein the registration request is a request to register a NF profile for the first NF producer node at the SCP node, wherein the NF profile indicates a service address for the first NF producer node;
  in response to the received registration request, determine that the NF profile for the first NF producer node is currently registered with a first NRF node in the communication network;
  in response to the determination, send an update request to the first NRF node to update the NF profile currently registered for the first NF producer node stored by the first NRF node, to replace the service address of the first NF producer node stored by the first NRF node with a first service address of the SCP node; and
  prior to the determination, send an authorisation request to the first NRF node to request authorisation to access service information of NF producer nodes stored by the first NRF node.

3. The SCP node as claimed in claim 2, wherein the SCP node is further operative to, prior to the determination, send a subscription request to the first NRF node to subscribe to changes in services of the first NF producer node.

4. The SCP node as claimed in claim 3, wherein the subscription request sent to the first NRF node is for subscribing to changes in services of all NF producer nodes for which NF profiles are stored by the first NRF node.

5. The SCP node as claimed in claim 2, wherein the SCP node is further operative to, prior to receiving the registration request:
  receive a first de-registration request from the first NF producer node, wherein the first de-registration request is a request to de-register the first NF producer node from the first NRF node; and
  in response to the received first de-registration request, send an acknowledgement of the first de-registration request to the first NF producer node.

6. The SCP node as claimed in claim 5, wherein in response to the received first de-registration request, the SCP node does not send a corresponding de-registration request to the first NRF node on behalf of the first NF producer node.

7. The SCP node as claimed in claim 5, wherein the SCP node is further operative to:
  determine if the received first de-registration request comprises an indicator that the first NF producer node is to change to a different NRF node;
  if the received first de-registration request does comprise the indicator, in response to the received first de-registration request the SCP node is configured to not send a de-registration request to the first NRF node on behalf of the first NF producer node; and
  otherwise, send a second de-registration request to the first NRF node, wherein the second de-registration request is a request to de-register the first NF producer node from the first NRF node.

8. The SCP node as claimed in claim 5, wherein the SCP node is further operative to:
  following receipt of the first de-registration request, determine whether the registration request is received from the first NF producer node within a predetermined time period of receipt of the first de-registration request;
  if not, send a second de-registration request to the first NRF node, wherein the second de-registration request is a request to de-register the first NF producer node from the first NRF node; and
  otherwise, in response to the registration request being received within the predetermined time period, the SCP node is configured to not send a de-registration request to the first NRF node on behalf of the first NF producer node.

9. The SCP node as claimed in claim 2, wherein the SCP node is operative to send the update request as a request to replace the stored NF profile for the first NF producer node with a new NF profile for the first NF producer node that has the service address of the SCP node as the service address of the first NF producer node.

10. The SCP node as claimed in claim 2, wherein, to determine that the NF profile for the first NF producer node is currently registered with the first NRF node, the SCP node is operative to:
   send a discovery request to the first NRF node, wherein the discovery request requests discovery of the NF profile for the first NF producer node; and
   receive a discovery response from the first NRF node, wherein the discovery response comprises the NF profile for the first NF producer node.

11. The SCP node as claimed in claim 2, wherein the NF profile for the first NF producer node further comprises an indication of one or more services provided by the first NF producer node.

12. The SCP node as claimed in claim 2, wherein the NF profile of the first NF producer node indicates that the first NF producer node is capable of providing at least a first service to consumer nodes, and wherein the SCP node is further operative to:
   receive a service request from a second NF consumer node, wherein the service request is a request for a first service to be provided to the second NF consumer node;
   identify from the NF profile that the first NF producer node is capable of providing the first service;
   send the service request received from the second NF consumer node to the first NF producer node using the service address of the first NF producer node in the NF profile.

13. The SCP node as claimed in claim 12, wherein the SCP node is further operative to handle further communications relating to the provision of the first service between the first NF producer node and the second NF consumer node.

14. A first network function (NF) producer node for use in a communication network, wherein the first NF producer node is to migrate from a direct communication mode with a first NF consumer node to an indirect communication mode with the first NF consumer node via a Service Communication Proxy (SCP) node in the communication network, wherein the first NF producer node comprises processing circuitry and a memory, said memory containing instructions executable by said processing circuitry whereby said first NF producer node is operative to:
   update a stored service address for a network repository function (NRF) node in the communication network to a service address of the SCP node, wherein the NRF node is storing a NF profile for the first NF producer node;
   send a registration request to the SCP node, wherein the registration request is a request to register a NF profile for the first NF producer node at the SCP node; and
   prior to sending the registration request:
      send a de-registration request to the SCP node, wherein the de-registration request is a request to de-register the first NF producer node from the first NRF node, and wherein the de-registration request comprises an indicator of whether the first NF producer node is to change to a different NRF node; and
      receive an acknowledgement of the first de-registration request from the SCP node.

15. The first NF producer node as claimed in claim 14, wherein the first NF producer node is further operative to receive a service request from the SCP node, wherein the service request is a request for a first service to be provided by the first NF producer node to a second NF consumer node.

16. The first NF producer node as claimed in claim 14, wherein the first NF producer node is further operative to, after sending the registration request, perform at least one of sending or receiving, via the SCP node, communications relating to a service provided by the first NF producer node to the first NF consumer node.

* * * * *